United States Patent [19]

Hutton

[11] Patent Number: 4,869,156
[45] Date of Patent: Sep. 26, 1989

[54] CONTROLLED ENVIRONMENT SYSTEM AND METHOD FOR CONSTRUCTING SAME

[75] Inventor: Corrin H. Hutton, Star, Id.

[73] Assignee: D-Con-Tainer, Inc., Elko, Nev.

[21] Appl. No.: 125,966

[22] Filed: Nov. 27, 1987

[51] Int. Cl.$^4$ ............................................. F24F 11/00
[52] U.S. Cl. .................................... 98/1.5; 52/79.5;
   98/42.02; 135/105; 403/108; 403/292
[58] Field of Search ............... 98/1, 1.5, 33.1, 42.02;
   52/79.1, 79.12, 79.5, 79.9, 173.05; 135/105, 902;
   403/108, 292, 295, 298, 326

[56] References Cited

U.S. PATENT DOCUMENTS

| | | | |
|---|---|---|---|
| 1,843,312 | 2/1932 | Ames | 135/105 |
| 3,446,523 | 5/1969 | Little | 403/108 |
| 4,304,224 | 12/1981 | Forthey | 128/1 R |
| 4,353,661 | 10/1982 | Rüther | 403/295 X |
| 4,581,986 | 4/1986 | Conklin et al. | 98/1 |
| 4,706,551 | 11/1987 | Schofield | 98/1 |

FOREIGN PATENT DOCUMENTS 2814818 10/1978 Fed. Rep. of Germany ...... 403/108

Primary Examiner—Harold Joyce
Attorney, Agent, or Firm—Joseph G. Seeber

[57] ABSTRACT

A controlled environment system and method for constructing same provides for the containment and safe handling of toxic waste materials which are ultimately collected and disposed of without contamination of the external atmosphere. The system generally comprises a frame, a seamless tube-like liner connected to the interior of the frame, at least one air lock disposed within the liner for compartmentalizing the liner, and a negative pressure source for creating a negative-pressure environment within the liner so as to prevent the escape of toxic waste materials therefrom. The invention also includes a unique retainer ring for interconnecting adjacent structural members during assembly, and for rapidly disconnecting the structural members during disassembly without the use of a tool.

22 Claims, 6 Drawing Sheets

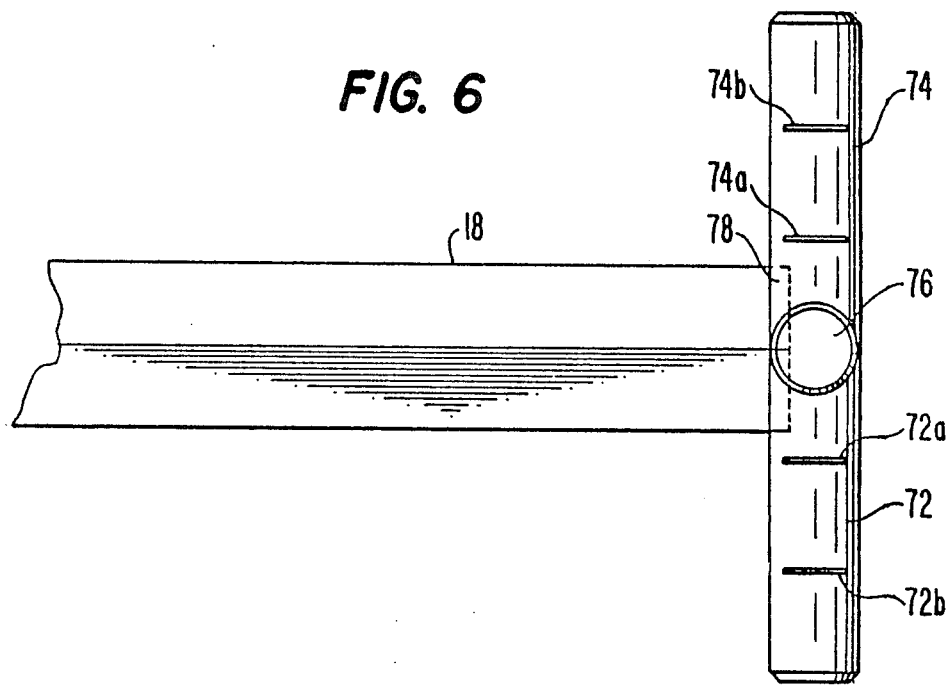
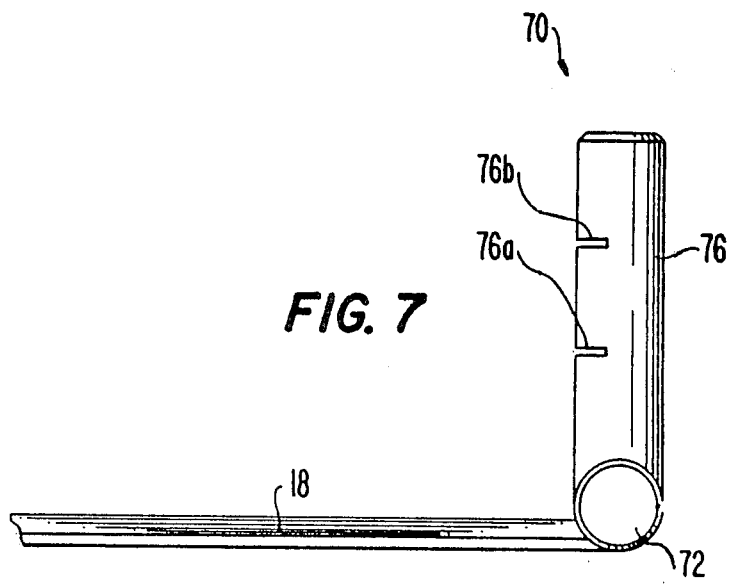
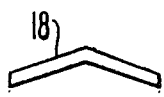

CONTROLLED ENVIRONMENT SYSTEM AND METHOD FOR CONSTRUCTING SAME

DESCRIPTION TECHNICAL FIELD

The invention generally relates to a controlled environment system and method for constructing same. In particular, the invention relates to a system and method for creating a controlled environment within which toxic waste materials are contained and safely handled, the toxic waste materials being ultimately collected and disposed of without contamination of the external atmosphere. The invention also includes a unique mechanism for interconnecting adjacent structural members of the system during assembly, and for rapidly disconnecting them during disassembly.

BACKGROUND ART

In recent years, there has been increasing emphasis on the safe handling and disposal of toxic waste materials considered to be hazardous to the health of the general population if such materials are permitted to contaminate the atmosphere. Such safety concerns are particularly prevalent in the area of asbestos removal.

Prior to developing the invention, the inventor became aware of the need for a prefabricated structure, partially disposable, that would meet the requirements outlined in regulations issued by the Occupational Safety and Health Administration and the Environmental Protection Agency for the safe removal of hazardous wastes such as asbestos. Principal requirements for such a structure were (1) safety, (2) facility and speed in assembly, (3) flexibility with regard to the configurations which could be constructed, (4) disposability, (5) facility, speed and safety in disassembly, and (6) economy in construction and assembly.

Until now, contractors have been compelled to construct some type of enclosure at the site using lumber and plastic sheets bound together by adhesive tape, but the resulting enclosure turned out to be slow to construct, expensive to construct, and inefficient and even unsafe to use.

Environmental enclosures have existed in the prior art, but have not been suitable for use at a demolition or renovation site. Such an enclosure is disclosed in U.S. Pat. No. 4,304,224—Fortney. The enclosure disclosed in this patent is intended to provide a germ-free atmosphere or "clean room" for laboratory or research use. It is composed of a structural frame which supports a flexible transparent plastic film defining a sealed chamber or room into which air is introduced through a two-stage filter system and from which air is exhausted through a filter duct. Prior to entering the "clean room", an operator must put on a hermetically sealed suit which has a provision for receiving air from the outside and for discharging air to the exterior. The suit permits the operator to move freely within the chamber without destroying the germ-free atmosphere therein and without being contaminated by materials contained within the chamber.

Obviously, the type of enclosure disclosed in the Fortney patent is not at all suitable for use as a controlled environment system for the handling, containment and safe disposal of hazardous materials such as asbestos. Such an enclosure must be directed to the purpose of preventing exterior contamination by the contents of the enclosure, whereas the Fortney arrangement is directed to prevention of interior contamination of the enclosure by germs migrating from the exterior. In addition, the controlled environment system of concern herein must provide easy access to working personnel and their equipment, while the Fortney arrangement sacrifices easy access in favor of hermetic sealing of the enclosure via the use of sealed zippered doors. Finally, the controlled environment system of concern herein must be flexible as to the size and structure of configurations which can be constructed, and must also provide for the safe and easy disposal of hazardous materials within the enclosure once the work is completed. In contrast, the Fortney arrangement is quite standard and inflexible with regard to the configuration that can be constructed, and does not make provision for the disposal of the contents of the enclosure once work is completed (in fact, the Fortney enclosure is not discarded once the work is completed).

Two other patents, U.S. Pat. Nos. 4,059,903 and 4,108,509 of Piet et al, merely disclose a controlled environment work enclosure of small size for use in a laboratory for the handling of mercury and mercury alloys. The work enclosure of Piet et al merely comprises a hollow housing defining a small workspace with replaceable flexible plastic or rubber gloves affixed to glove rings mounted on the front of the unit to permit convenient working access to the platform contained within the unit. Thus, this arrangement is suitable for the use of hazardous materials within a laboratory, and not as a large-scale construction or demolition enclosure for the safe handling of asbestos during removal activities. Furthermore, the arrangement of Piet et al is not a disposable arrangement.

U.S. Pat. No. 4,626,291 Natale discloses a portable containment device for the treatment of hazardous materials, such as asbestos insulation. However, the Natale arrangement merely comprises a portable containment device or containment bag system having glove inserts for use in the removal of asbestos from an individual pipe section. Thus, Natale does not disclose a large-scale containment enclosure for use during demolition and large-scale asbestos removal activities.

Other patents which typify the state of the art with respect to the general technical area of concern herein include the following: 3,252,258; 3,364,642; 3,505,989; 3,561,487; 3,883,715; 4,128,966; 4,128,973; 4,163,342; 4,292,762; 4,304,068; 4,632,847; and 4,637,301.

DISCLOSURE OF THE INVENTION

The present invention generally relates to a controlled environment system and method for constructing same, and more particularly a controlled environment enclosure for use in renovation, demolition, or removal of asbestos.

The enclosure of the present invention basically comprises a support structure and liner material to be disposed inside the support structure. The support structure or frame is constructed of uniformly sized structural aluminum tube sections, with interior corner, exterior corner and intermediate dowl connecters being used to assemble the free-standing frame from the aluminum tube sections.

The liner material is made up of three-ply (interior bonding and exterior ply) bonded polyethylene or polypropylene seamless tube material, preferably in sections of 200 feet or greater length. If excessively long enclosures are needed, liner sections can be spliced together using adhesive tape and/or conventional clamping-/joining device.

The liner material is pre-fabricated with four or more nylon strips or strips made of other selected synthetic materials attached to it and running the length of the liner in four parallel paths. Each nylon strip serves to connect the liner material to a respective one of four longitudinal rails of the structural frame. Pre-fabricated air locks are provided and fit inside the liner at any point, the air locks extending from floor to ceiling and wall to wall, and being held securely in place with adhesive forming a secure air-tight seal. Such air locks partition the structure into separate rooms, such as a clean room, shower room and equipment room.

The enclosure of the present invention is constructed in such a manner as to overcome the disadvantages of prior art systems and enclosures, discussed above. Specifically, the liner material is a seamless tube which has provision for easy attachment to the support frame during assembly, and for easy detachment from the frame once the work is completed and the disposal phase is to be carried out.

The support frame itself is easily and quickly constructed, without the use of tools, from aluminum tube sections of standard length, and specially designed dowl connectors are provided in order that the construction personnel be afforded the advantage of flexibility in terms of the type or size of frame configurations which may be constructed. In accordance with the invention, quick assembly and disassembly of the structural frame is facilitated by the employment of specially designed retainer rings which snap easily into place around the tube-dowl interconnections, and which are easily and quickly removed by hand during the disassembly process.

Finally, the paramount requirement of safety in removal operations is satisfied by the present invention in that, once the frame is constructed and the liner is installed within the frame, a negative air pressure is imposed on the interior of the liner so as to preclude the escape of contaminants from the interior of the liner during the removal procedure.

Therefore, it is a primary object of the present invention to provide a controlled environment system and method for constructing same.

It is an additional object of the present invention to provide a controlled environment system made up of a support frame for holding a seamless liner, the support frame being constructed in such a manner as to afford flexibility with respect to the configurations which can be constructed.

It is an additional object of the present invention to provide specially designed dowl connectors and retainer rings for use in constructing a structural frame of adjustable size without the use of tools or special implements at the work site.

It is an additional object of the present invention to provide a controlled environment system made up of a support frame and a seamless liner, the liner material being three-ply bonded polyethylene or polypropylene seamless tube material.

It is an additional object of the present invention to provide a controlled environment system having a support frame and a liner attached thereto in such a manner that the liner can be quickly removed at the completion of the demolition activities, the liner and the contaminants contained therein being easily and safely disposable at the end of such activities.

It is an additional object of the present invention to provide a controlled environment system which may be safely utilized to prevent contamination of the exterior atmosphere by the hazardous materials contained within the system, a negative air pressure source being used in conjunction with the system to impose a negative air pressure on the interior of the system, thus precluding the escape of contaminants into the exterior atmosphere.

It is an additional object of the present invention to provide a controlled environment system which utilizes air locks connected to the interior of the liner at any point therein so as to partition the structure flexibly into separate rooms of any desired size.

The above and other objects that will hereinafter appear, and the nature of the invention, will be more clearly understood by reference to the following detailed description, the drawings, and the appended claims.

BRIEF DESCRIPTION OF DRAWINGS

FIG. 6 is a plan view of a top or bottom transverse rail and an interior corner connector in the controlled environment system of the present invention.

FIG. 7 is front view of the transverse rail and interior corner connector of FIG. 6.

FIG. 8 is an end view of the transverse rail of FIGS. 6 and 7.

BEST MODE FOR CARRYING OUT THE INVENTION

The invention will now be described in more detail with reference to the various figures of the drawings.

Figure 1:
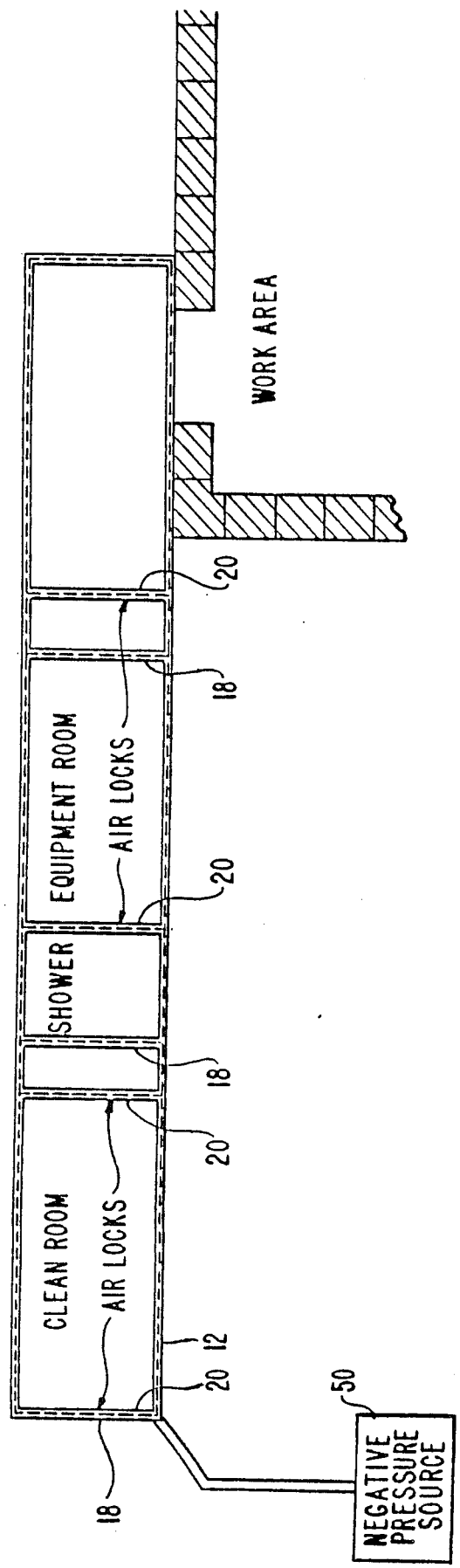
FIG. 1 is a top view of the overall configuration of the controlled environment system of the present invention.
Figure 2:
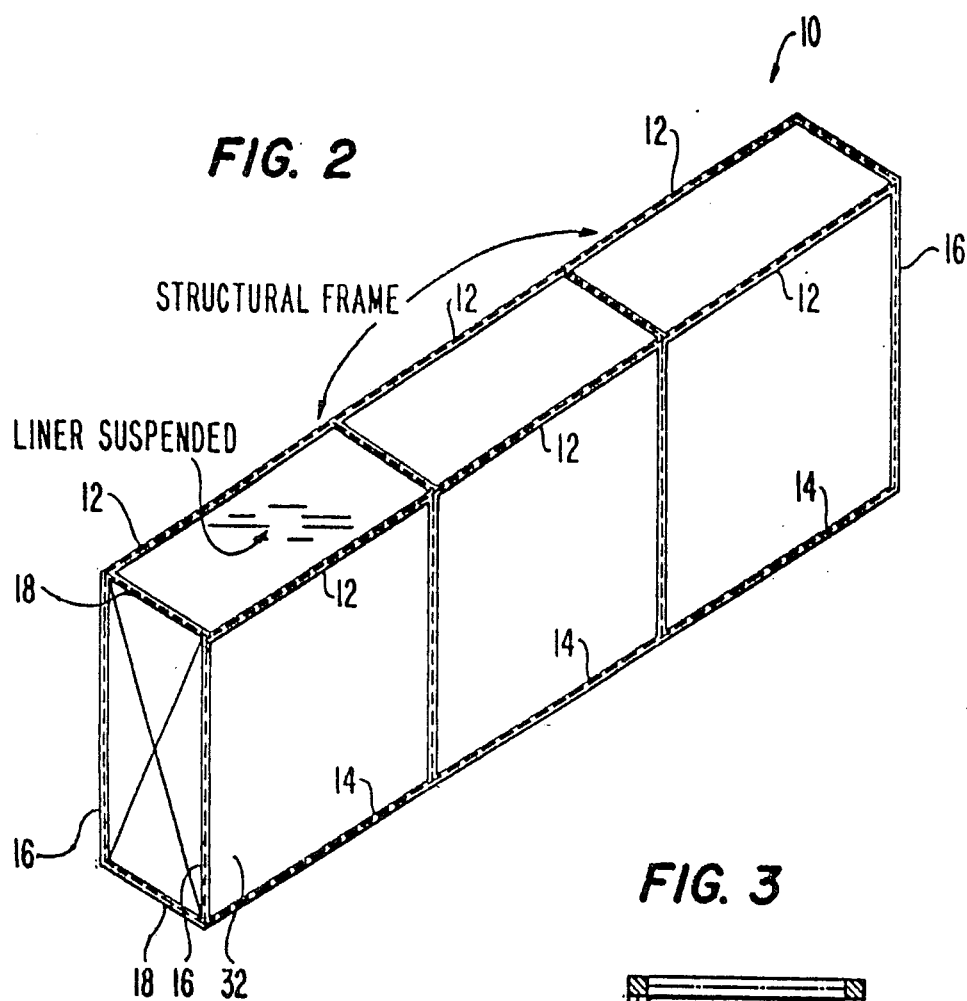
FIG. 2 is a perspective view of the structural frame and suspended liner of the controlled environment system of the present invention.

FIG. 1 is a top view of the overall configuration of the controlled environment system of the present invention, while FIG. 2 is a perspective view of the structural frame and suspended liner thereof. As seen therein, the controlled environment system 10 comprises a supporting structure or structural frame made up of top longitudinal members 12, bottom longitudinal members 14, vertical members 16, and transverse top and bottom rails 18. Preferably, the latter elements are relatively short and light, thus allowing for rapid assembly and disassembly with a minimum amount of labor and no tools. For example, members 12, 14 and 16 are preferably aluminum tube, while element 18 is preferably an aluminum bar (discussed in more detail below with reference to FIG. 6). The supporting structure, as thus described, is outside of the area of contamination and is not intended to be disposable.

The controlled environment system 10 also includes a containment system comprising a seamless plastic tubelike liner 32 which maintains its structural integrity when constant negative static air pressure is applied, the liner 32 being suspended from the interior of the supporting structure previously described. Preferably, the liner 32 is an envelope of three-ply (interior, bonding and exterior ply) bonded polypropylene or polyethylene of variable and continuous length. As will be described in further detail later, adjustable nylon ties are used to suspend the plastic liner 32 from the structural frame, the dimensions of the liner 32 and the adjustability of the nylon ties being such as to provide a generally rectangular passageway of generally fixed width (3') and height (7'), and of variable length. Preferably, the liner 32 is of sufficient length so that splicing is not necessary. However, extraordinary length of the liner 32 can be achieved by splicing fixed-length sections together as each successive liner section is suspended within the structural frame during assembly. The method of supporting the plastic liner within the structural frame avoids contamination of the frame itself, and thus the structural frame can be reused at various sites even though the liner 32 is discarded at each site at the end of removal activities.

In accordance with the present invention, prefabricated air locks 20 are supplied with the system 10 and may be fixed to the inside of the tube 32 at desired intervals so as to subdivide the passageway into "rooms" of variable length. In this manner, during assembly, various compartments—such as a "clean room", a shower area, an equipment room, and the like—can be designed into the system, thus providing the workmen with a place in which to change from street clothing to protective clothing for use in the decontamination area, a room for showering of personnel for the purpose of decontamination, and a "dirty room" where contaminated clothing and equipment can be stored.

Once the structural frame is assembled, the liner 32 suspended inside the frame, and the air locks 20 put in place, a negative pressure source 50 is preferably connected to the system 10 and is operated to maintain a negative internal pressure (preferably, 0.3 psi or less) so as to control or prevent the migration of contaminants to the external atmosphere. By way of example, the negative pressure source 50 may be any conventional vacuum pump, preferably with an appropriate filtering system.

Figure 3:
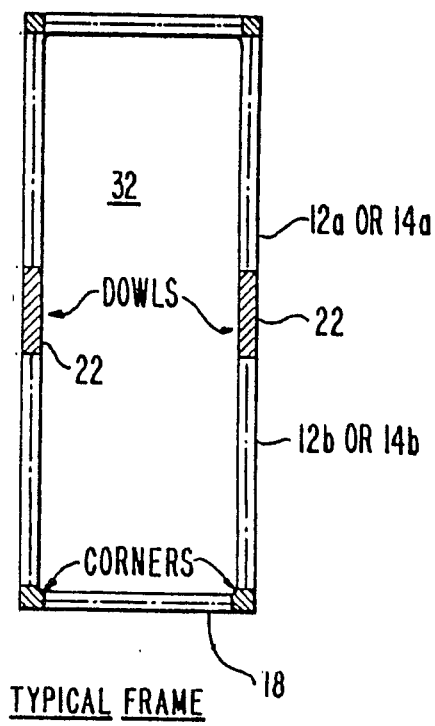
FIG. 3 is a top or bottom view of a structural frame section of the controlled environment system of FIGS. 1 and 2.
Figure 4:
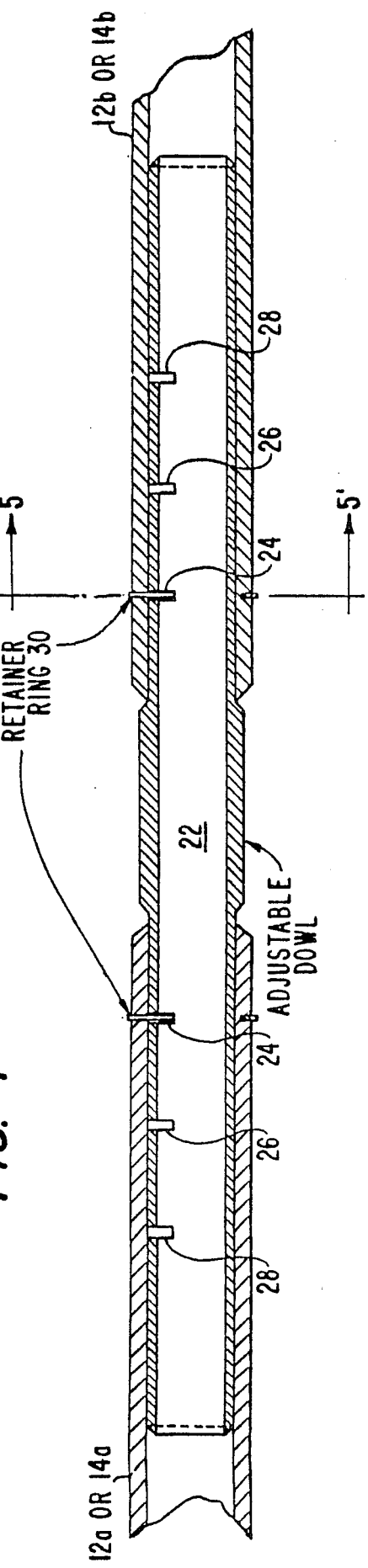
FIG. 4 is a side sectional view of an adjustable dowl used to join adjacent tube sections within the controlled environment system of the present invention.

FIG. 3 is a top or bottom view of a portion of the structural frame of the system 10 shown in FIG. 2, while FIG. 4 is a side-sectional view of the adjustable dowl connector of the system of the present invention.

As mentioned previously, in order to facilitate rapid assembly and disassembly of the structural frame of the system 10, pieces which are short and light are employed in order to construct the various members of the structural frame. Accordingly, in order to construct the upper longitudinal members 12 and the lower longitudinal members 14, tubular pieces or members 12a or 14a and 12b or 14b, each measuring approximately three feet in length, are joined together by an adjustable dowl 22. As best seen in FIG. 4, the adjustable dowl 22 is preferably ⅞ inch in diameter and 16 inches in length, and fits telescopically in the interior of each tubular member 12a or 14a and 12b or 14b.

As also seen in FIG. 4, each adjustable dowl 22 is provided with slots 24, 26 and 28 located two inches, three inches and four inches, respectively, on each side of the center of the dowl 22. Furthermore, each tubular member 12a or 14a and 12b or 14b has a slot located approximately one inch from the end of each member. Thus, as seen in FIG. 4, member 12a or 14a is joined to member 12b or 14b by telescopically inserting a corresponding end of the dowl 22 into the members 12a, 14a and 12b, 14b, respectively. The dowl 22 is adjusted so that one of the slots 24, 26 or 28 at each end of the dowl 22 lines up with a respective slot in the members 12 a, 14a and 12b, 14b, and retainer rings 30 are inserted into the aligned slots so as to lock the members 12a, 14a and 12b, 14b in place with respect to the dowl 22. The dowl 22 is, thus, adjustable in that the distance between the member 12a or 14a and the adjoining member 12b or 14b is adjustable and can be varied in accordance with the particular one of the slots 24, 26 or 28 selected and aligned with the corresponding slots in the members 12a, 14a and 12b, 14b.

Figure 5:
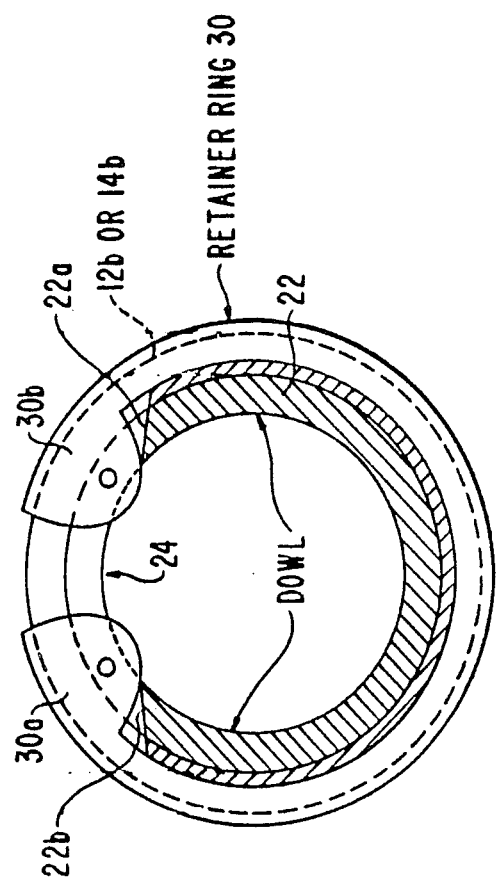
FIG. 5 is a cross-sectional view, taken along line 5-5' of FIG. 4, of an adjustable dowl, a tube section, and a retainer ring in the controlled environment system of the present invention.

FIG. 5 is a cross-sectional view of the member 12b or 14b in conjunction with the dowl 22 and retainer ring 30, as seen along section line 5-5' in FIG. 4. As seen in FIG. 5, the dowl 22 fits telescopically within the member 12b or 14b, and the retainer ring 30 fits around the member 12b or 14b and the dowl 22 contained therein. The retainer ring 30 is provided with protruding portions 30a and 30b which, when the retainer ring 30 is in place, protrude through the slot in member 12b or 14b and also into the slot 24 in the dowl 22 itself, thus locking the member 12b or 14b into a stationary relationship with the dowl 22, the other end of which is similarly locked into a stationary relationship with respect to the further member 12a or 14a (as described above with respect to FIG. 4).

It should be noted that the latter arrangement facilitates easy and quick disconnection of member 12b or 14b from the dowl 22 by manual manipulation of these elements by a worker without the use of any tools. When disconnection is desired, the worker merely twists the member 12b or 14b in one direction while twisting the dowl 22 in the other direction, whereupon one of the flat end surfaces 22a and 22b of the dowl 22 bear against a respective one of the protrusions 30a and 30b, forcing the protrusion 30a or 30b up and out of the slot 24, thus freeing the retainer ring 30 for manual removal and freeing the member 12b or 14b and dowl 22 for disconnection.

FIG. 6 is a plan view of an interior corner connector in the system 10 of FIG. 1, while FIG. 7 is an end view of the interior corner connector in the system 10 of FIG. 1. FIG. 8 is an end view of transverse member 18 in FIGS. 6 and 7. Referring back to FIG. 1, the term "interior corner connector" is intended to refer to a corner connector joining two longitudinal members 12 or 14 with a vertical member 16 and a transverse member 18.

Referring to FIGS. 6 and 7, the interior corner connector 70 comprises horizontal portions 72 and 74 and vertical portion 76, these three portions forming a T-type or multidirectional connector. Each of portions 72, 74 and 76 has cross-sectional dimensions identical to that of a dowl connector 22 as seen in FIG. 4 (that is, each is preferably ⅜ inch in diameter).

Furthermore, horizontal portions 72 and 74 are provided with slots 72a, 72b and 74a, 74b, respectively, located approximately 1 inch and 2 inches, respectively, from the center of the connector 70. Vertical portion 76 is similarly provided with slots 76a and 76b located approximately 1 and 2 inches, respectively, from the center of the connector 70. Transverse member 18 is connected by means of a fillet weld 78 to the bottom of the connector 70, as best seen in FIG. 7.

The interior corner connector 70 is used to interconnect two horizontal longitudinal members 12 or 14, each member 12 or 14 being slipped telescopically onto a respective one of the portions 72 and 74. Each member 12 or 14 is then adjusted with respect to portion 72 or 74 so that the slot located approximately 1 inch from the end of the member 12 or 14 (as described with respect to FIG. 4) is aligned with one of the slots 72a, 74a or 72b, 74b in the portion 72 or 74. Once alignment is achieved, a retainer ring 30 is positioned around these elements and used to lock the two elements into a stationary position with respect to each other, in the manner seen in FIG. 5 and described above.

Similarly, a vertical member 16 is connected by slipping it telescopically over the portion 76, aligning the slot in the end portion of member 16 with one of the slots 76a or 76b, and then locking the two elements into stationary relationship with respect to each other by means of a retainer ring 30.

The transverse member 18 is shown in cross-section in FIG. 8, and has an inverted-V shape with a break of 15°. The member 18 is designed in this manner so that, when the member 18 is used as a bottom transverse member in the system 10, personnel and equipment can be moved easily through the passageway formed by the system 10 of FIG. 1.

It should be noted that an exterior corner connector is located at each exterior corner of the structural frame, and serves to connect a longitudinal member 12 or 14, a vertical member 16 and a transverse member 18. Such an exterior corner connector is L-shaped rather than T-shaped, and is identical to the interior corner connector 70 of FIGS. 6 and 7 except that one of the horizontal portions 72, 74 is eliminated. Finally, disconnection of the various members from the interior and exterior corner connectors is carried out manually without the use of tools in the manner described above with respect to the intermediate dowl 22 of FIGS. 4 and 5.

Figure 9A:
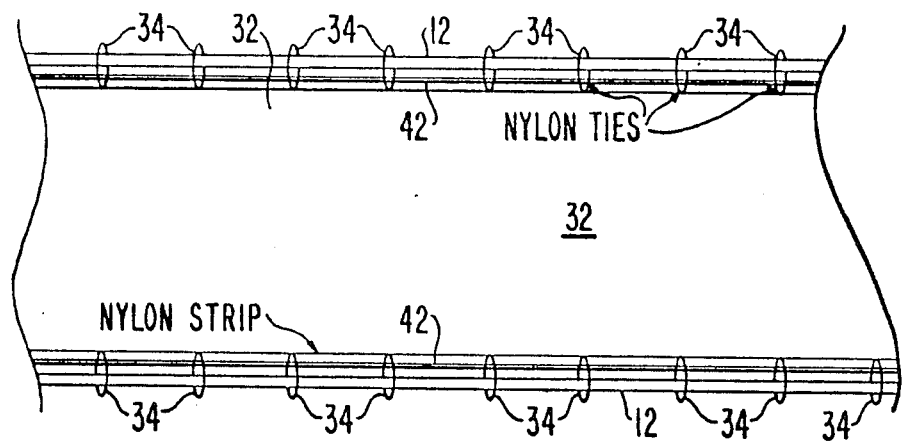
FIG. 9A is a plan view of the seamless liner connected to the longitudinal frame sections or rails in the controlled environment system of the present invention.
Figure 9B:
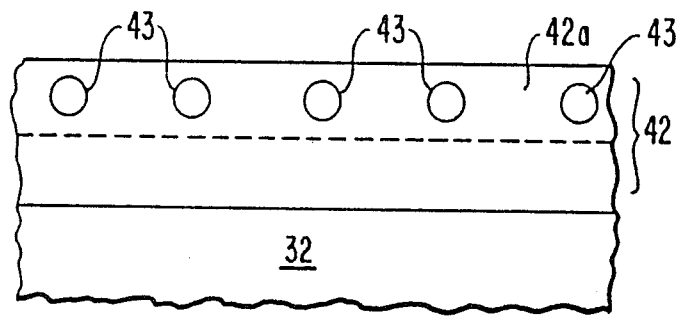
FIG. 9B is a plan view of a portion of the nylon strip connector shown in FIG. 9A.
Figure 10:
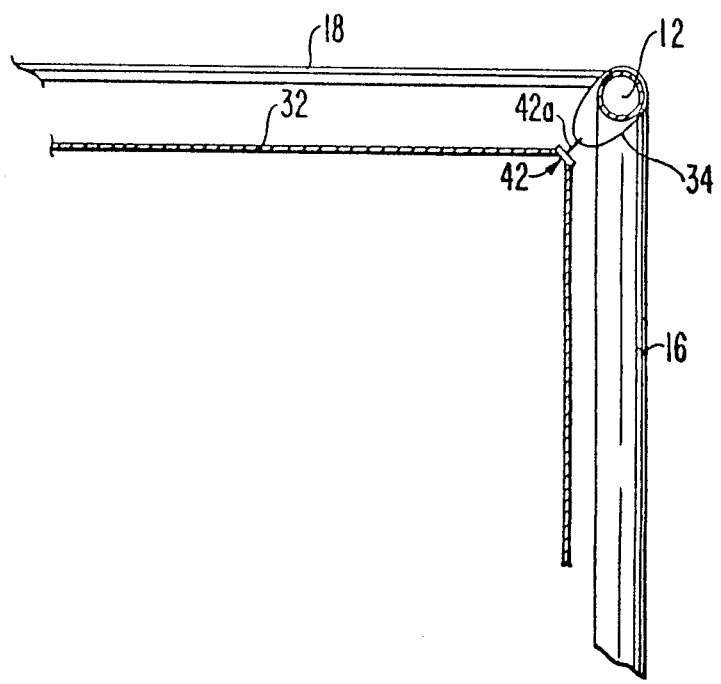
FIG. 10 is a sectional view of the seamless liner connected to a longitudinal frame section in the controlled environment system of the present invention.

FIG. 9A is a plan view of a portion of the seamless liner of the system 10 of FIG. 1, FIG. 9B is a plan view of a portion of the nylon strip connector shown in FIG. 9A, and FIG. 10 is a cross-section view of the seamless liner shown in FIG. 9A.

Referring to FIGS. 1, 9A, 9B and 10, it will be recalled from the previous discussion that, once the structural frame of the system 10 is constructed, a 3-ply plastic liner 32 is suspended from the interior of the structural frame. Specifically, as seen in FIGS. 9A, 9B and 10, the plastic liner 32 is constructed with four or more nylon strips 42 running longitudinally along the length of the plastic liner 32, the four nylon strips 42 being spaced transversely in such a way that each nylon strip 42 aligns with a respective longitudinal member 12 or 14 of the frame. Preferably, the nylon strip 42 has a flap or extended portion 42a (best seen in FIGS. 9B and 10), through which a plurality of grommets, holes or perforations 43 are positioned (preferably, approximately 12 inches apart). In this manner, the plastic liner 32 is connected at 12-inch intervals to a member 12 or 14 by use of an adjustable tie 34. Further referring to FIGS. 2, 9A and 10, in the manner described above, the plastic liner 32 is connected to all top and bottom longitudinal members 12 and 14 at intervals of 8 to 12 inches so as to construct a passageway up to 200 feet in length without splicing. When splicing is necessary, a conventional clamp can be used to join two adjacent plastic liners 32 by forming an air-tight seal between the two liners, adhesive being applied prior to clamping the two liners together.

Figure 11:
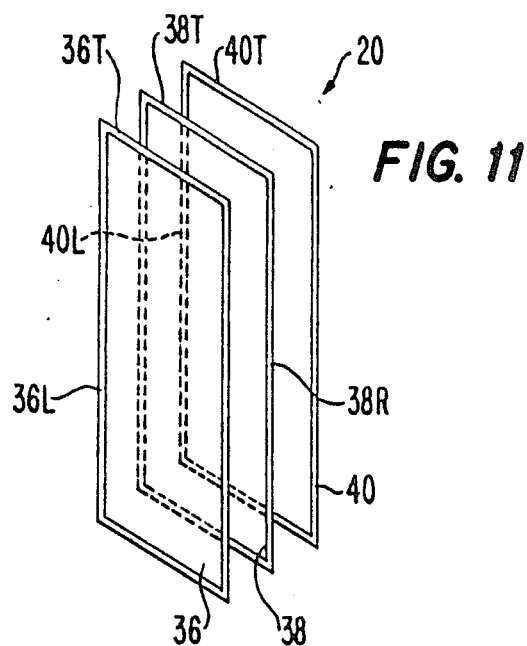
FIG. 11 is a perspective view of an air lock arrangement used in the controlled environment system of the present invention.
Figure 12A:
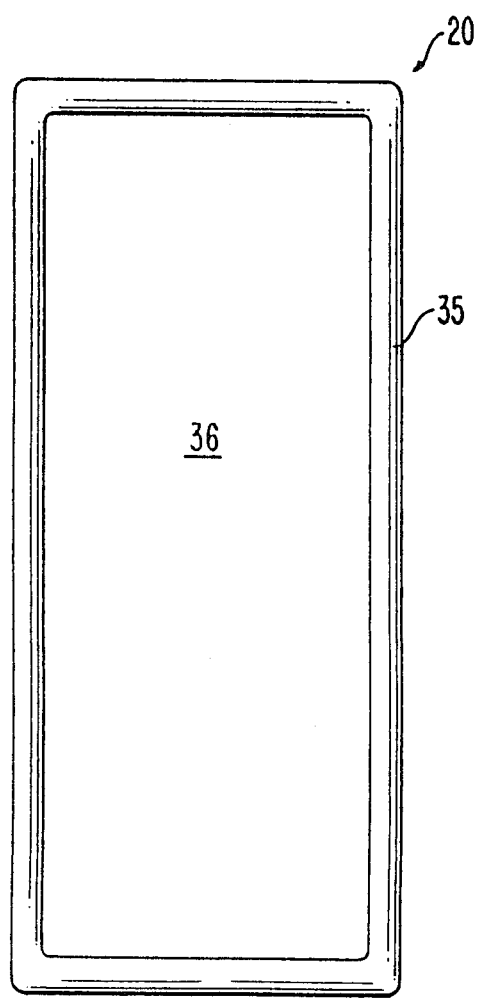
FIG. 12A is a front view and FIG. 12B is an end view in section of the air lock of FIG. 11.
Figure 12B:
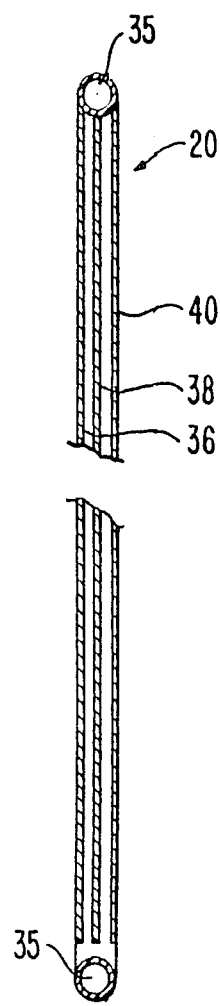

FIG. 11 is a perspective view of an air lock 20, while FIG. 12A is a front view and FIG. 12B is a side view of the air lock 20. In accordance with the invention, air locks 20 are prefabricated, and preferably constructed of three alternating 5—6 mil plastic flaps attached to a common polyvinylchloride (PVC) frame. The air lock 20 is designed to fit inside the system 10 (FIG. 2) at any point along the passageway, the air lock 20 extending from floor to ceiling and wall to wall, and being held securely in place with adhesive tape in order to insure an air-tight seal.

As seen in FIG. 11, each sheet of plastic flap is, in accordance with the invention, suspended within the PVC frame. All flaps are connected at their top edges 36T, 38T and 40T to the frame, with flap 36 being additionally connected at side 36L, flap 38 being additionally connected at side 38R, and flap 40 being connected additionally at side 40L.

Referring to FIGS. 12A and 12B, it is seen that the 3-ply material of air lock 20 is contained within a plastic frame 35. The frame 35 is, preferably, an SCD-40 PVC frame. Each plastic flap is, preferably, a 5 mil plastic flap and is attached to the PVC frame 35 as described above.

While preferred forms and arrangements have been shown in illustrating the invention, it is to be understood that various changes in detail and arrangement may be made without departing from the spirit and scope of this disclosure.

For example, it should be understood that the dimensions shown herein are merely for the sake of example and may be modified without departing from the scope of the invention.

I claim:

1. A controlled environment system for the safe handling and disposal of toxic waste materials contained in a work area, said system comprising:
    a frame;
    a seamless tube-like liner providing an air-tight passageway leading to the work area containing the toxic waste materials;
    connecting means for connecting said liner to said frame so that said liner is suspended from and supported by said frame;
    air lock means disposed within said liner and displaced from the work area for compartmentalizing said liner to form at least one air-tight compartment within said liner; and
    negative pressure means connected to said liner for evacuating air from said air-tight passageway to create a negative-pressure environment within said liner, whereby the toxic waster materials are prevented from escaping from said liner.

2. The system of claim 1, wherein said frame is constructed of horizontally disposed members each comprising a first section, a second section, and dowl means for interconnecting said first and second sections.

3. The system of claim 2, wherein said first section and said second section each comprise a hollow tube, said dowl means comprising a generally cylindrical member inserted telescopically within said first section and said second section.

4. The system of claim 3, wherein said generally cylindrical member has a cylindrical surface which is discontinuous at each end of said generally cylindrical member so as to form slots at said each end, said system further comprising retainer means for connecting said generally cylindrical member at said each end of said cylindrical surface to said first section and said second section.

5. The system of claim 4, wherein said retainer means comprises a first retainer ring which connects said first section to said generally cylindrical member, said first retainer ring having a portion which protrudes through an opening in said first section and into one of said slots of said cylindrical surface, and a second retainer ring which connects said second section to said generally cylindrical member, said second retainer ring having a portion which protrudes through an opening in said second section and into another of said slots of said cylindrical surface.

6. The system of claim 1, wherein said connecting means comprises at least one attachment strip disposed on an exterior surface of said liner, said at least one attachment strip being discontinuous so as to form a plurality of holes therein, said connecting means including a plurality of ties equal in number to said plurality of holes for binding said liner to said frame.

7. The system of claim 1, wherein said air lock means comprises at least one air lock arrangement, each said air lock arrangement comprising an air lock frame and a plurality of plastic flaps connected to said air lock frame.

8. The system of claim 7, wherein each of said plastic flaps has a top edge and a side edge connected to said air lock frame, adjacent plastic flaps having different side edges connected to said air lock frame, thereby maintaining an air-tight seal within said liner.

9. The system of claim 1, wherein said frame is constructed of horizontally disposed members interconnected to form an upper section and a lower section, and vertically disposed members for interconnecting said upper section and said lower section, said horizontally disposed members including longitudinal and transverse members, and wherein said transverse members in said lower section have angular cross sections defining an angle greater than 90 degrees but less than 180 degrees and are disposed with said angle opening downward, whereby to facilitate the passage of traffic over said transverse members in said lower section.

10. The system of claim 1, wherein said negative pressure means comprises a vacuum pump and a hose extending from said vacuum pump through said liner into said passageway leading to the work area.

11. The system of claim 1, wherein said frame is constructed of longitudinal members, transverse members and vertical members, said system comprising interior corner connecting means for interconnecting two longitudinal members, a transverse member and a vertical member.

12. The system of claim 11, said, interior corner connecting means comprising a multidirectional connector having a first portion which is inserted into one of said two longitudinal members, a second portion which is inserted into another of said two longitudinal members, and a third portion which is inserted into said vertical member.

13. The system of claim 12, wherein each of said first, second and third portions has at least one slot which is alignable with a corresponding opening in its corresponding one of said two longitudinal members and said vertical member, said interior corner connecting means further comprising three retainer rings, each retainer ring having a portion which protrudes through the corresponding opening in said corresponding one of said two longitudinal members and said vertical member, and which portion fits into a corresponding slot of said at least one slot, whereby to lock said two longitudinal members and said vertical member in stationary relationship with respect to said first, second and third portions of said interior corner connecting means.

14. The system of claim 1, wherein said frame is constructed of longitudinal members, transverse members and vertical members, said system comprising exterior corner connecting means for interconnecting a longitudinal member, a transverse member and a vertical member.

15. The system of claim 14, said exterior corner connecting means comprising a multidirectional connector having a first portion which is inserted into said longitudinal member and a second portion which is inserted into said vertical member.

16. The system of claim 15, wherein each of said first and second portions has at least one slot which is alignable with a corresponding opening in its corresponding one of said longitudinal member and said vertical member, said interior corner connecting means further comprising at least two retainer rings, each retainer ring having a portion which protrudes through the corresponding opening in said corresponding one of said longitudinal member and said vertical member, and which portion fits into a corresponding slot of said at least one slot, whereby to lock said longitudinal member and said vertical member in stationary relationship with respect to said first and second portions of said interior corner connecting means.

17. A controlled environment system for the safe handling and disposal of toxic waste materials contained in a work area, said system comprising:
    a frame;
    a seamless tube-like liner providing an air-tight passageway leading to the work area containing the toxic waste materials;
    connecting means for connecting said liner to said frame so that said liner is suspended from and supported by said frame; and
    air lock means comprising at least one air lock arrangement, each said air lock arrangement comprising an air lock frame and a plurality of plastic flaps connected to said air lock frame;
    wherein each of said plastic flaps has a top edge and a side edge connected to said air lock frame, adjacent plastic flaps having different side edges connected to said air lock frame, thereby maintaining an air-tight seal within said air lock means and said passageway.

18. A controlled environment system for the safe handling and disposal of toxic waste materials contained in a work area, said system comprising:
    a frame;

a seamless tube-like liner providing a passageway leading to the work area containing the toxic waste materials; and connecting means for connecting said liner to said frame so that said liner is suspended from and supported by said frame;

wherein said frame is constructed of longitudinal members, transverse members and vertical members, said system comprising interior corner connecting means for interconnecting two longitudinal members, a transverse member and a vertical member;

said interior corner connecting means comprising a multidirectional connector having a first portion which is inserted into one of said two longitudinal members, a second portion which is inserted into another of said two longitudinal members, and a third portion which is inserted into said vertical member;

wherein each of said first, second and third portions has at least one slot which is alignable with a corresponding opening in its corresponding one of said two longitudinal members and said vertical member, said interior corner connecting means further comprising at least three retainer rings, each retainer ring having a portion which protrudes through the corresponding opening in said corresponding one of said at least two longitudinal members and said vertical member, and which portion fits into a corresponding slot of said at least one slot, whereby to lock said two longitudinal members and said vertical member in stationary relationship with respect to said portions of said interior corner connecting means.

19. A controlled environment system for the safe handling and disposal of toxic waste materials contained in a work area, said system comprising:

a frame;

a seamless tube-like liner providing a passageway leading to the work area containing the toxic waste materials; and connecting means for connecting said liner to said frame so that said liner is suspended from and supported by said frame;

wherein said frame is constructed of longitudinal members, transverse members and vertical members, said system comprising exterior corner connecting means for interconnecting a longitudinal member, a transverse member and a vertical member;

said exterior corner connecting means comprising a multidirectional connector having a first portion which is inserted into said longitudinal member and a second portion which is inserted into said vertical member;

wherein each of said first and second portions has at least one slot which is alignable with a corresponding opening in its corresponding one of said longitudinal member and said vertical member, said interior corner connecting means further comprising at least two retainer rings, each retainer ring having a portion which protrudes through the corresponding opening in said corresponding one of said longitudinal member and said vertical member, and which portion fits into a corresponding slot of said at least one slot, whereby to lock said longitudinal member and said vertical member in stationary relationship with respect to said first and second portions of said interior corner connecting means.

20. A retainer for interconnecting a first member and a second member, said first member having a hollow interior into which said second member is insertable, said retainer comprising:

ring means for partially encircling said first member, said first member having an exterior surface which is discontinuous so as to form an opening therein, said second member having an outer surface which is discontinuous so as to form at least one slot therein, said at least one slot being alignable with said opening in said first member when said second member is inserted into said first member, said ring means having two free ends which are positioned adjacent to said opening in said first member when said ring means encircles said first member; and protruding means positioned on each of said two free ends of said ring means for protruding through said opening of said first member and into said at least one slot of said second member;

whereby said retainer interconnects said first and second members.

21. The retainer of claim 20, wherein said first and second members are generally cylindrical in shape, and said retainer means comprises a retainer ring, said protruding means comprising a pair of ears, each ear being disposed at a respective free end of said retainer ring.

22. A method of constructing a controlled environment system for the safe handling and disposal of toxic waste materials contained in a work area, comprising the steps of:

(a) erecting a frame;

(b) disposing a seamless tube-like liner within said frame;

(c) connecting said liner to said frame so as to provide an air-tight passageway leading to the work area;

(d) disposing at least two spaced apart air locks within the liner so as to compartmentalize said liner and to form at least one air-tight compartment between said air locks within said liner; and (e) evacuating air from said air-tight passageway so as to create a negative-pressure environment within said liner, thereby preventing the toxic waste materials from escaping from said liner.

* * * * *